United States Patent [19]
Bushman et al.

[11] Patent Number: 4,774,097
[45] Date of Patent: Sep. 27, 1988

[54] CENTRIFUGAL FINISHER AND METHOD FOR SEPARATING JUICES FROM FRUITS AND VEGETABLES

[75] Inventors: Ronald C. Bushman, Hacienda Heights; William E. Harris, Jr., Glendora, both of Calif.

[73] Assignee: Brown International Corporation, Covina, Calif.

[21] Appl. No.: 77,421

[22] Filed: Jul. 24, 1987

[51] Int. Cl.[4] .......................... A23P 1/00; B30B 9/26; B01D 33/10
[52] U.S. Cl. ..................................... 426/489; 99/495; 100/117; 100/127; 210/217; 210/375; 210/405; 210/781; 210/784; 426/495
[58] Field of Search ........................ 426/489, 490, 495; 99/510, 511, 513, 495; 100/117, 127; 210/217, 375, 377, 380.3, 405, 416.1, 781, 784

[56] References Cited

U.S. PATENT DOCUMENTS 2,481,848  9/1949  Lapps ..................................... 99/511
4,705,055  11/1987  Rohm et al. ......................... 100/117

Primary Examiner—George Yeung
Attorney, Agent, or Firm—Paul A. Weilein

[57] ABSTRACT

A centrifugal finisher and method of its operation are disclosed for separating finished juice from an initial juice including substantial solids or for separating finished fluid from any slurry including substantial solids, the slurry being introduced into one end of a cylindrical screen driven in rotation for centrifugally urging the slurry against the screen and causing a fluid component to pass through the screen. Wiper paddles are arranged on a support drum for rotation in wiping contact with the screen and for limited movement relative to the screen for continuously moving solid material from the slurry toward an outlet axial end of the screen. Spreader elements are arranged in trailing relation to at least certain of the wiper paddles while being slightly spaced apart from the screen for spreading the solid material into a thin layer on the screen before it is engaged by subsequent wiper paddles, the support drum being driven by differential devices for regulating movement of the wiper paddles and spreader elements relative to the screen.

28 Claims, 4 Drawing Sheets

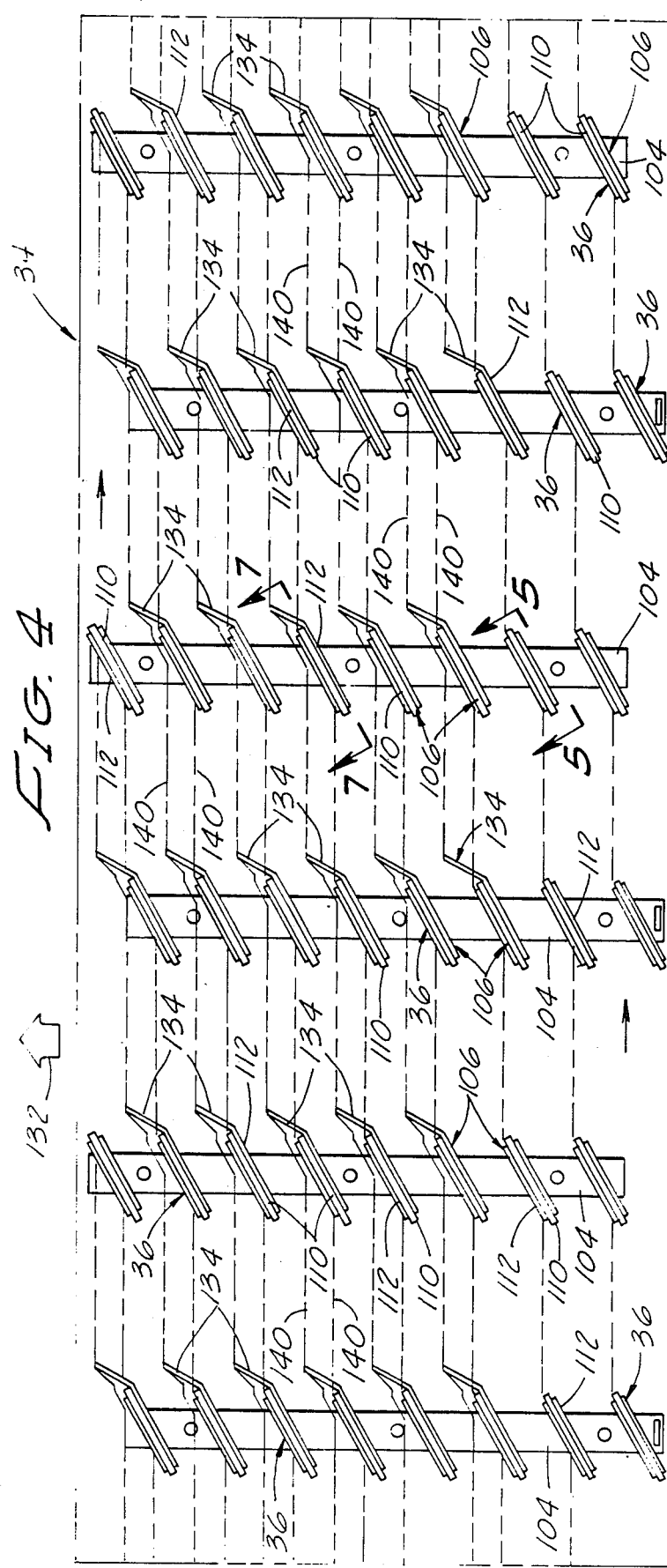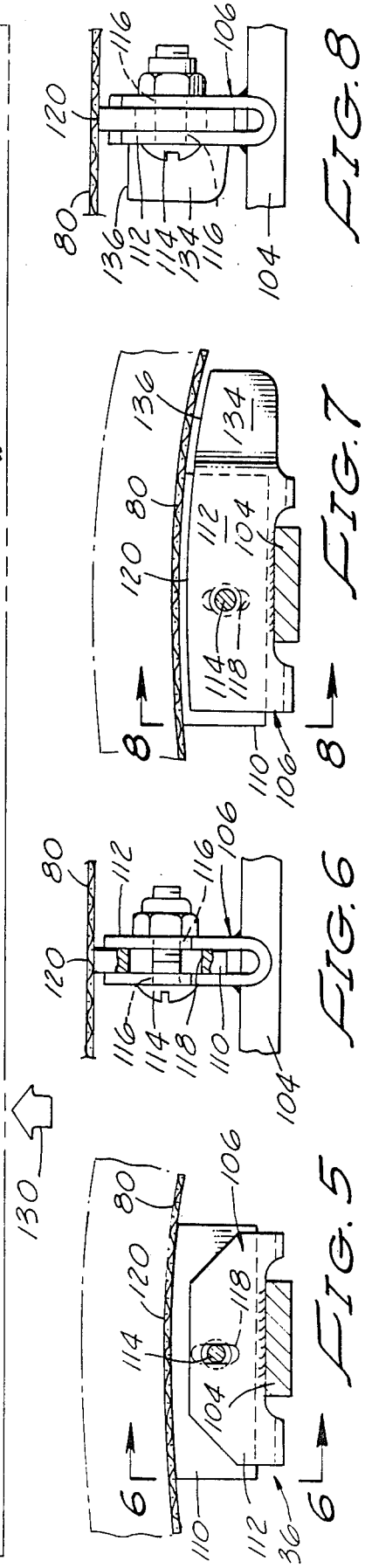

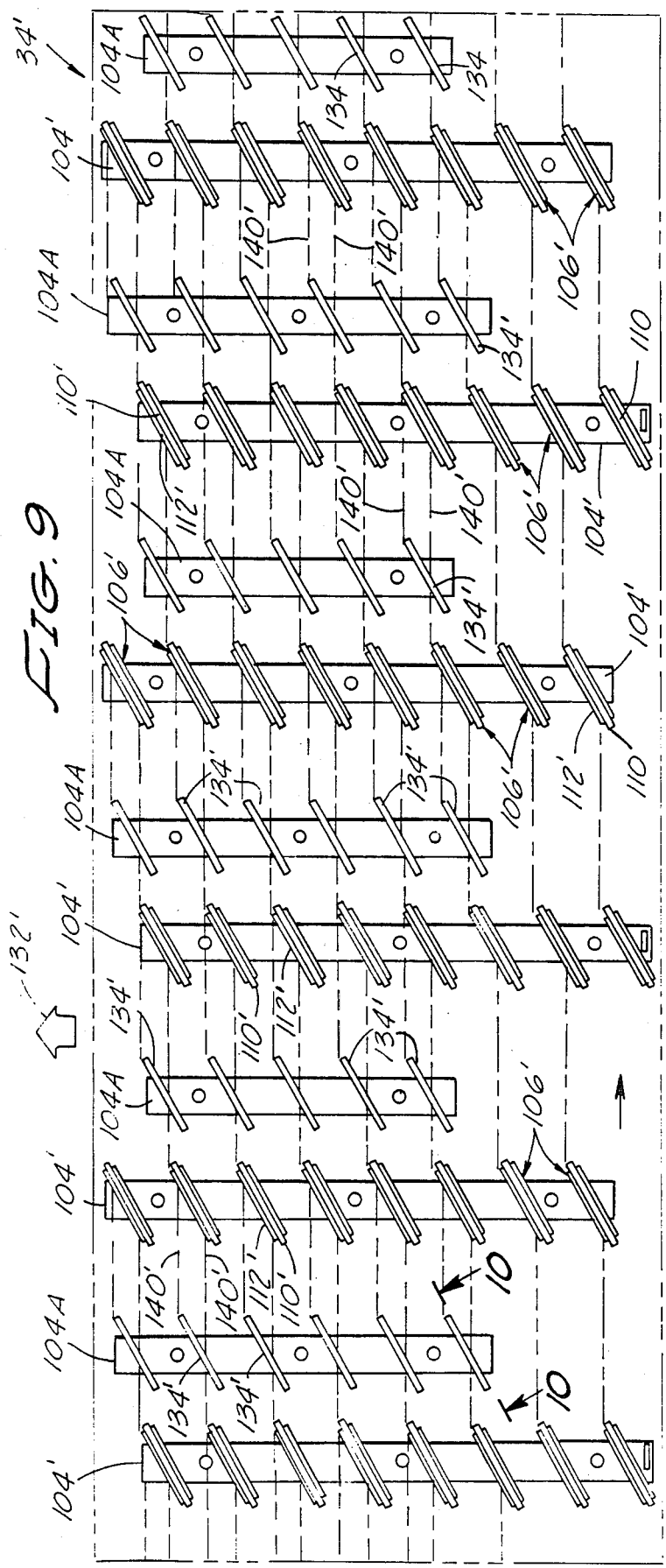
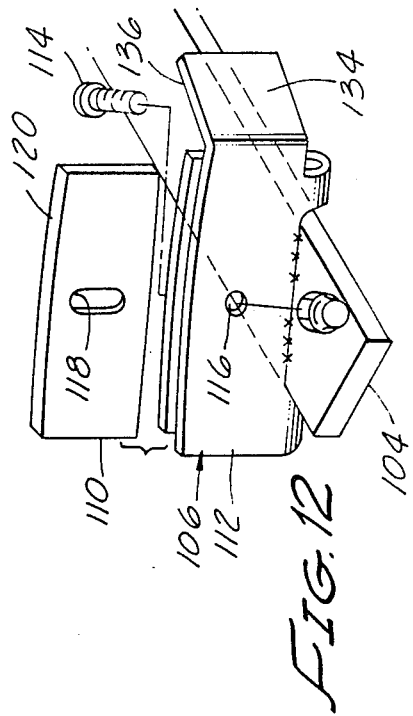
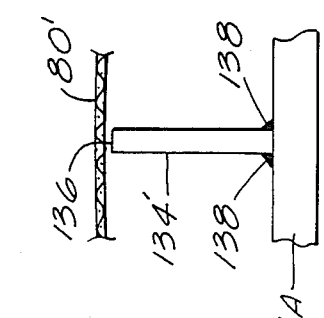
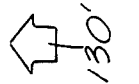
FIG. 9
FIG. 12
FIG. 11
FIG. 10

CENTRIFUGAL FINISHER AND METHOD FOR SEPARATING JUICES FROM FRUITS AND VEGETABLES

FIELD OF THE INVENTION

The present invention relates to an improved centrifugal finisher and related method for separating fluid from a slurry as in the extraction of finished juice from an initial juice including substantial solids. More particularly, the improved centrifugal finisher as well as the related method contemplate a finishing machine of the type including a screen which is driven in rotation for creating centrifugal force for causing a fluid component to pass through the screen and become separated from solids material retained on the screen.

BACKGROUND OF THE INVENTION

The production of juices from various fruits and vegetables has commonly involved first extracting an initial or raw juice including substantial amounts of solids such as rag, pulp from juice sacs, pectinous material, seeds, etc. Such initial juices have been obtained by various juice extracation machines. Typical examples of such juice extraction machines have been disclosed, for example, in U.S. Pat. Nos. 2,631,625 and 4,170,935. In the first noted patent, a machine was disclosed in which fruit or the like was cut in half and transferred into conveyor cups. Rotary reamers were then driven into engagement with the conveyor cups to extract initial juice from the fruit.

Similarly, the second noted patent disclosed a machine wherein fruit or the like was cut in half and conducted through gradually convergent paths to flatten the halves and express or extract pulpy juice therefrom. These machines have been effective in a preliminary step for obtaining initial or raw juice. However, it is commercially desirable to remove solid components from the juice to provide a so-called finished juice.

Typical commercial machines for converting initial juice to finished juice, or for removing fluid components from other types of slurries, have been characterized as either so-called screw-type or paddle-type finishers. Screw-type finishers have commonly been provided with spring or air-loaded pulp escape valve means at their discharge ends. As the fluid or juice passes through a stationary sceen, substantial solids tend to build up near the discharge outlet and it is sometimes necessary to apply air pressure against the valve means to assure removal of additional juice through the built-up solids. Such action has been found to be generally detrimental to juice quality.

In earlier paddle-type finishers, the slurry was introduced into a stationary screen of conical or cylindrical shape. Helical blades were rotated within the screen for conveying the slurry solids along the screen and for forcing components of the slurry through the screen. The clearance between the elongated blades and the screen had to be adjusted to achieve the desired separation of fluids through the screen. This required loosening and tightening of the blade mountings and relatively tedious adjustment of the elongated blades which resulted in lost operating time.

More recently, a paddle-type finisher was disclosed in U.S. Pat. No. 4,518,621 issued May 21, 1985 to Alexander under assignment to the assignee of the present invention. That patent disclosed a finishing machine wherein the slurry was introduced into one end of a cylindrical screen driven in rotation for exerting centrifugal force on the slurry to urge fluid to pass from the slurry through the screen. Paddle means were arranged for rotation with the screen but at a different speed so that the paddle means continuously moved or spread the slurry toward the outlet axial end of the screen.

The finishing machine disclosed in the preceding patent was found to be very effective in separating highly finished juice or fluid from an initial juice or slurry. The improved finishing machine of the present invention includes many features in common with that finishing machine. Accordingly, the above-noted patent is incorporated herein by reference as though set forth in its entirety to assure a more complete understanding of the present invention.

Even though the finishing machine of the above patent proved very effective, it has been found desirable to further improve both the processing rate for finishing operations employing such machines and also to assure relatively complete extraction of juice from other solids in the initial juice in order to make such operations both efficient and economical.

The factors of operating capacity and the degree of juice extraction are obviously related. For example, a relatively dry solids discharge could be obtained with a finishing machine of the type disclosed in the above patent, but only at the expense of a relatively low feed rate. Conversely, the finishing machine of the above patent could accept a higher feed rate but the solids discharge was found to be excessively wet with juice.

Accordingly, there has been found to remain a need for an improved finishing machine and method of operation for facilitating both efficient and economic finishing operations.

SUMMARY OF THE INVENTION

It is therefore an object of the invention to provide an improved centrifugal finishing machine and method of operation for efficiently and effectively separating fluid from a solidsladen slurry or more preferably for extracting highly finished juice from an initial juice.

It is a more specific object of the invention to provide such an improved centrifugal finisher and method of operation for separating fluid from substantial solids with the slurry being introduced into one end of a rotating cylindrical screen for causing centrifugal force to urge the fluid component through the screen for separation from the solids. According to the present invention, wiper means preferably in the form of paddles are arranged for movement relative to the screen and in wiping contact with the screen for successively moving solid material toward an outlet axial end of the screen, spreader means being arranged in offset and trailing relation to at least a portion of the wiper means and in slightly spaced apart relation from the screen so that the spreader means spread solid material containing some fluid on the screen before it is again engaged and moved by the wiper means in order to permit centrifugal force to more efficiently urge fluid from the slurry through the screen.

Efficiency and operating capacity for the improved centrifugal finisher and related method of the present invention may be best discerned by comparison with U.S. Pat. No. 4,518,621 referred to and incorporated by reference above. That patent also disclosed the use of paddle means having the stated purpose of "spreading" remaining fluid-containing solids upon the screen while 4,774,097

3 also moving them toward an outlet axial end of the screen. However, the paddles of the patent were allowed to engage the screen under the influence of centrifugal force so that substantially no solids material was allowed to pass between the paddles and the screen. Rather, that patent relied primarily on spreading effect of the remaining solids material for any spreading effect of the solids upon the screen.

Accordingly, as the fluid or juice initially separates from the slurry at the inlet end of the screen, the remaining volume of slurry still containing some fluid or juice was conveyed toward the discharge end of the screen. However, the remaining slurry became richer and richer in solids as it was conveyed along the screen. This effect substantially reduced the volume of the slurry and increased its percentage of solids so that the slurry could no longer flow or cover the screen surface uniformly. In fact, it was observed during operation that only approximately ten percent of the above patent area was covered with slurry, particularly adjacent the axial outlet end of the screen.

The improved centrifugal finisher and related method of operation according to the present invention summarized above is effective to make the finishing machine both more effective in terms of operating capacity and, at the same time, in terms of complete extraction of juice from the slurry.

It is accordingly a related object of the invention to provide an improved centrifugal finisher and related method of operation wherein the wiper means are mounted in relatively free-floating relation or preferably a cylindrical wiper passage adjacent the paddles, the wiper means being formed as extensions of at least adjacent the im... achieving the improved... ions are...

The present inve... proved centrifugal f... separating fluid f... solids. In accord... the improved cen... erably contemp... by removal of...

The centrif... similar const... patent incor... description si... finisher inv... invention. overall c... The above... script...

DESCRIPTION EM...

FIG. 4 is a developed view illustrat... section of wiper paddles and spreader means of...

FIG. 5 is an enlarged view taken along... ture of FIG. 4;

FIG. 6 is a view taken along...

FIG. 7 is an enlarged view tak...

Figure 1:
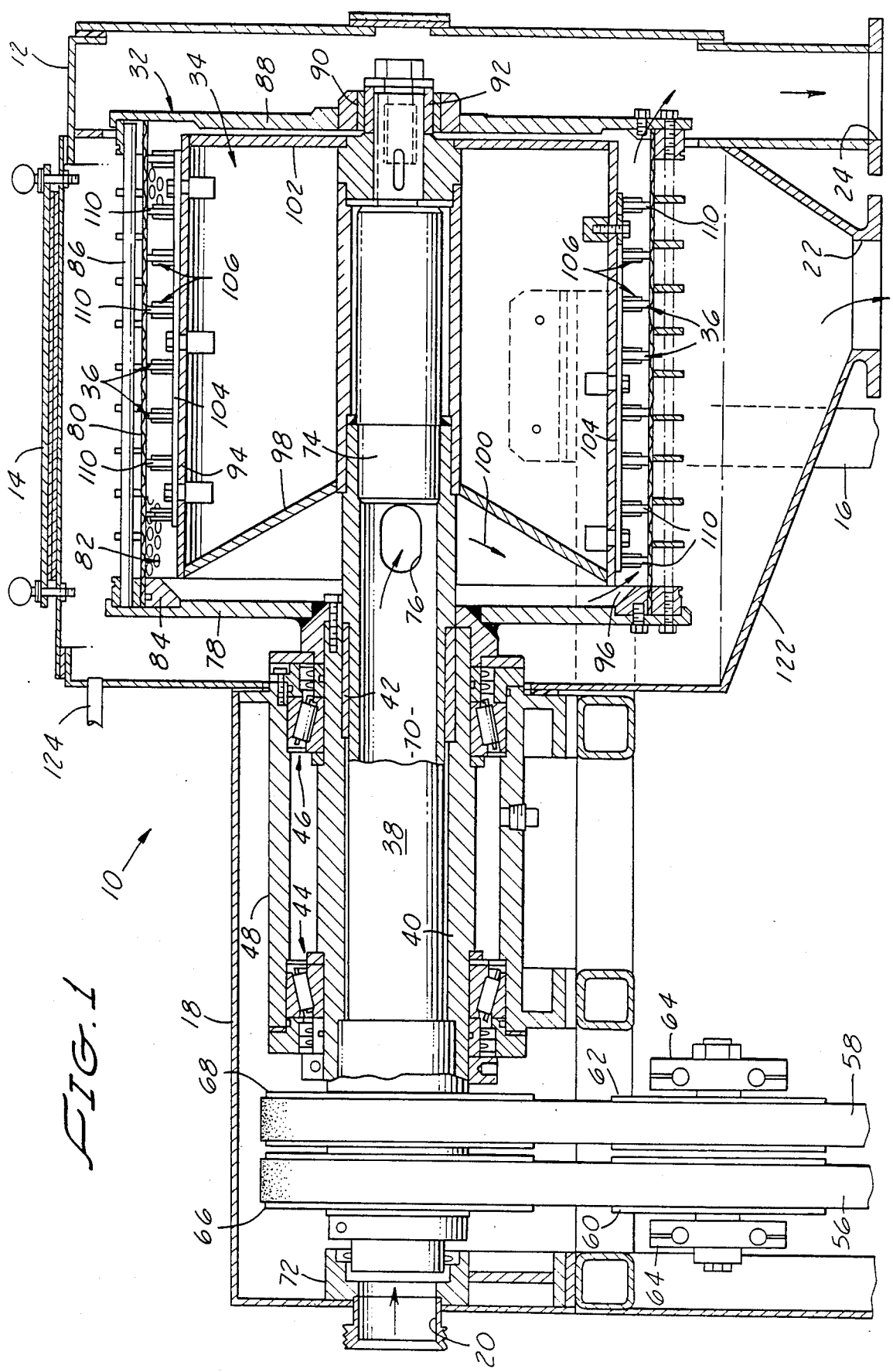
FIG. 1 is a side elevational view, with pa... tion, of a centrifugal finisher embodying parts constructed in with the present invention with drum structure.

5—5 of FIG. 5;

FIG. 7; 7 of FIG. 6;

FIG. 8 is a view taken alon...

FIG. 9 is a developed view...

illustrating another embodim...

FIG. 10 is an enlarged vi...

10—10 of FIG. 9;

FIG. 11 is an enlarged...

11—11 of FIG. 10; and

FIG. 12 is an exploded...

wiper-spreader assembl...

DESCRIPTION...

the screen can be adjusted in order to regulate movement of the wiper paddles relative to the screen. By such adjustment, solids from the slurry may be moved along the screen at varying rates.

Construction of a finishing machine as summarized immediately above is generally similar to the finishing machine of the above-noted patent. The centrifugal finisher of the present invention is also similar to the finishing machine of that patent in providing a controlled environment about the rotating screen. This is accomplished in a manner hereinafter described so that separation of a finished juice from an initial or raw juice can be accomplished under a pressurized atmosphere of an inert gas such as nitrogen, for example, or even under a low vacuum if advantageous in the processing of such juices.

In addition to the above features which are important to the centrifugal machine and method of operation for the present invention, the invention also comtemplates the essential inclusion of spreader means in close association with at least a portion of the wiper means or wiper paddles referrd to above. As will be made more apparent in the following description, the spreader means are arranged in trailing and offset relation relative to the wiper paddles while being slightly spaced apart form the screen. With this arrangement, the wiper paddles serve the functions described above while the apreader means serve alternately to again spread the solids in a thin layer across the surface of the screen to facilitate separation of fluid therefrom by centrifugal force before the solids are again contacted by subsequent wiper paddles.

Advantages of the present invention can be best seen by comparison with the above-noted patent which referred to a path of slurry (109) illustrated in FIG. 6 of that patent. In accordance with the present invention, it is visualized that the path has significant width as the slurry enters the inlet end of the screen. As the slurry approaches the axially central portion of the screen, the width of the path has decreased because of a reduction in slurry volume due to fluid exiting through the screen. Accordingly, the width of the path of slurry solids continually decreases along the axial length of the screen until it covered only a very small area of the screen.

At the same time, toward the discharge end of the screen, the higher solids slurry encountered in the finishing machine of the above patent tended to build up and generally pack immediately in front of the paddles. The paddles were still effective in conveying the solids toward the discharge end; however, as the slurry became drier, the path width became narrower and the depth of the path became greater because of the above compacting effect.

The result of the above effects was that, in the finishing mcahine of the above patent, the remaining juices in the slurry toward the outlet axial end of the screen was faced with a relatively thick layer of solids preventing its passage outwardly through the sceen under the influence of centrifugal force.

In the improved centrifugal finisher and method of the present invention, by contrast, preferably after about onequater of the axial length of the screen from the inlet end, spreader means are associated with all or part of the wiper paddles in order to spread the solids into a thin layer over a substantial portion of the screen prior to the solids again being contacted by a subsequent wiper paddle. In this manner, the wiper paddles of the present invention serve an unexpected benefit in combination with the trailing spreader means. With the spreader means forming a thin layer of the solids across the surface of the screen, the wiper paddles then contact the thinly spread solids, turning and bunching them and again allowing another subsequent spreader element to spread the turned solids into a thin layer again to further facilitate separation of remaining fluid or juice.

These advantages and additional advantages of the present invention are made more apparent in the following description having reference to the accompanying drawings.

Referring to the drawings, and particularly to FIG. 1, a finishing mahine, generally indicated at 10, includes a housing 12 having an inspection cover 14. The housing is mounted on a support structure partially illustrated at 16. A subhousing portion 18 is also mounted on the structure 16 adjacent the housing 12 for enclosing a drive mechanism hereinafter described in detail.

In accordance with the invention, a product such as the initial or raw juice or fruit such as citrus fruit or vegetables ir prepared as a liquified slurry by separation machinery of the type described above and not forming a part of the present invention. In any event, the slurry is introduced into an inlet 20 located at one end of the housing portion 18. A juice outlet 22 is located at the other axial end of the machine on the main housing 12 along with an outlet 24 for solids or particulate material separted from the slurry in the finishing machine 10.

The juice outlet 22 is preferably connected to an air trap (not shown) through which the finished juice is discharged while preventing the entrance of air into the apparatus during operation. The solids outlet 24 preferably communciates with a screw assembly (not shown) through a conical nozzle (not shown) for conveying the solids from the finishing machine. Thus, the mass of discharge solids form an effective barrier to prevent the entrance of air into the machine. Further, the slurry to be processed is contained in a reservoir (not shown) and is pumped from the bottom of the reservoir into the apparatus with a minimum of entrained air. Thus, air is substantially excluded from entering the apparatus during operation so that the finished juice is substantially free from oxidation.

Continuing with refernce to FIG. 1, a cylindrical screen assembly 32 is arranged or rotation within the housing 12. A cylindrical drum assembly 34, providing support for a plurality of free-floating wiper paddles 36, is arranged within the cylindrical screen assembly 32. The cylindrical drum assembly 34 and screen assembly 32 are respectively secured for rotation with coaxial inner and outer drive shafts 38 and 40. The inner drive shaft 38 is supported for rotation relative to the outer drive shaft 40 by bearing means 42. the outer drive shaft 40 is rotatably supported by bearings 44 and 46 within a bearing housing 48 mounted on the support structure 16.

As may be best seen by reference to the patent incorporated by reference above, a motor (not shown) is preferably mounted on a lower portion of the structure 16 while being coupled with drive pulleys (not shown). Drive belts 56 and 58, preferably in the form of timing belts are trained respectively about the drive pulleys and are also preferably passed over respective timing idler pulleys 60 and 62 mounted on pillow block bearings 64.

The drive belts 56 and 58 are trained over driven pulleys 66 and 68 which are respectively secured to the inner and outer drive shafts 38 and 40 as illustrated in FIG. 1. Thus, the motor serves to drive the screen assembly 32 and cylindrical drum assembly 34 in rotation through the drive mechanism referred to above and the drive shafts 38 and 40. The drive mechanism provides a differential function permitting adjustment in the relative rates of rotation for the screen assembly 32 and cylindrical drum assembly 34.

The relative rates of rotation for the screen and drum are determined by the sizing of the drive pulleys and driven pulleys referred to above. The differential speed for the drum assembly 34 and screen assembly 32 results in relative movement providing a particular advantage within the present invention as will be made apparent below.

The inner drive shaft 38 includes an axially extending passage 70 in communication at one end with the inlet 20. A seal assembly 72 is adapted to maintain a seal between the rotating shaft 38 and the stationary inlet 20. Thus, the seal assembly 72 prevents air from contaminating the slurry or initial jucie entering the passage 70 from the inlet 20. The other end of the passage 70 is blocked at 74 while a plurality of radial openings, one of which is indicated at 76, direct slurry from the passage 70 into one end of the screen assembly 32.

The cylindrical screen assembly 32 and drum assembly 34 are mounted in cantilevered fashion upon the respective drive shafts 40 and 38. In particular, the outer drive shaft 40 is secured to the cage support plate 78. The screen assembly 32 includes a cylindrical screen 80, formed with a multiplicity of small openings generally indicated at 82, the screen 80 being secured by suitable means such as a screen guide ring 84 and a support cage 86 which is secured at one end to the support plate 78 and at the other end to a cage support spider 88. The support cage surrounds the cylindrical screen 80 in order to provide reinforcement and to prevent axial movement of the screen when it is being rotated at substantial speeds for centrifugally separating juice from the slurry as hereinafter described. The cage support spider 88 is supported by bearing means 90 mounted on a sleeve 92 secured to the end of the inner shaft 38.

The screen holes 82 may vary from about 0.005 inches to 0.125 inches in diameter depending on the type of juice desired, that is, depending upon the pulp level in the finished juice. In so-called single finishing of the juice, a screen with openings of about 0.016 to 0.020 inches in diameter is employed. In so-called double finishing of the juice, the slurry is first processed with a screen having holes about 0.125 inches in diameter and the juice product is subsequently further processed with a screen having holes about 0.005 to 0.020 inches in diameter.

The drum assembly 34 is secured to the inner shaft 38 and includes a cylindrical drum member 94 arranged in inwardly spaced relation to the cylindrical screen 80 in order to form an elongated annular passage 96 for receiving the flow of juice or slurry.

One end of the drum 94 is supported on the shaft 38 by a conical wall 98 which combines with the cage support 78 to form a radial passage 100 for conducting slurry or initial juice from the inlet 20 through the axial passage 70 and the radial openings 76 into the inlet end of the annular passage 96. The other end of the cylindrical drum 94 is supported on the shaft 38 by a wall 102. With this arrangement, initial juice or slurry entering the annular passage 96 is urged against the rotating screen 80 by centrifugal force. At the same time, the slurry solids are effectively moved toward the outlet end of the annular passage 96 from where they may pass through the cage support spider 88 to the solids outlet 24.

Figure 2:
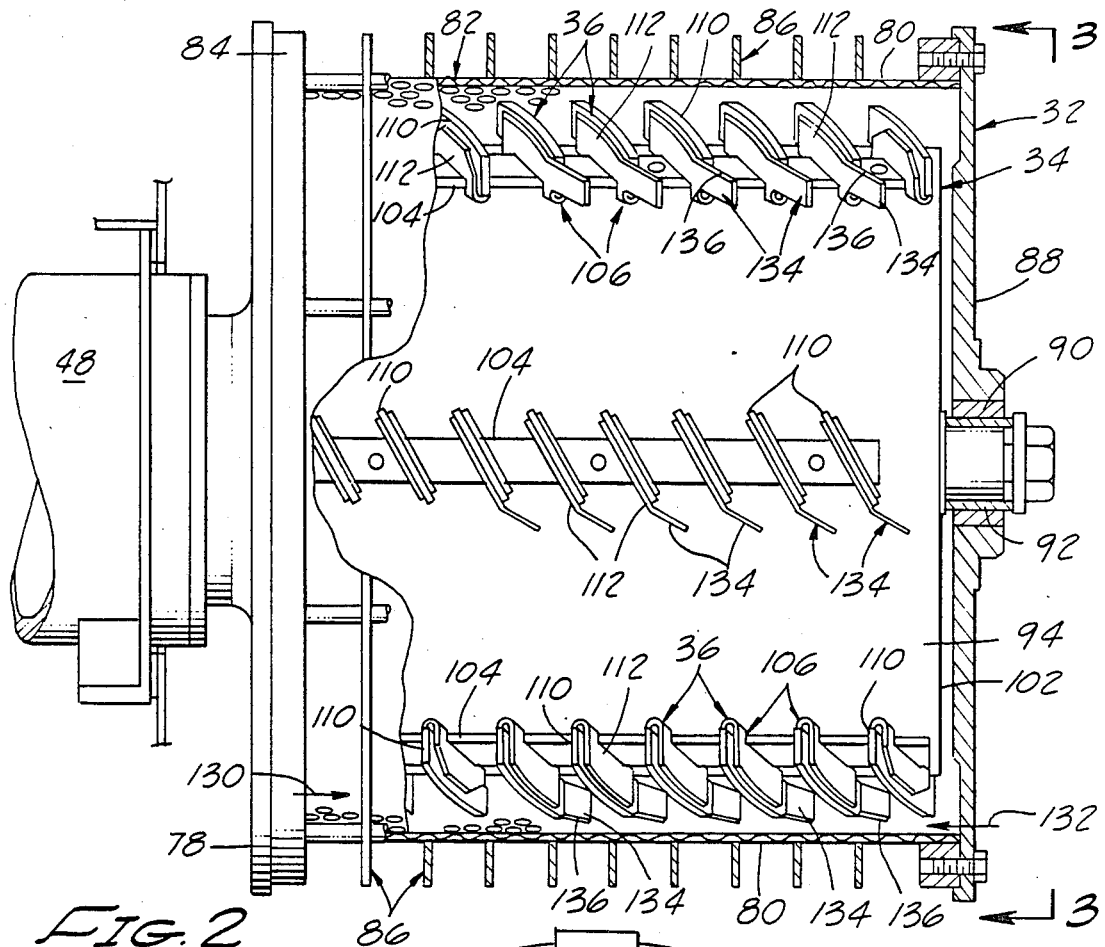
FIG. 2 is a similar to FIG. 1 but with a small portion of the drum structure being broken
Figure 3:
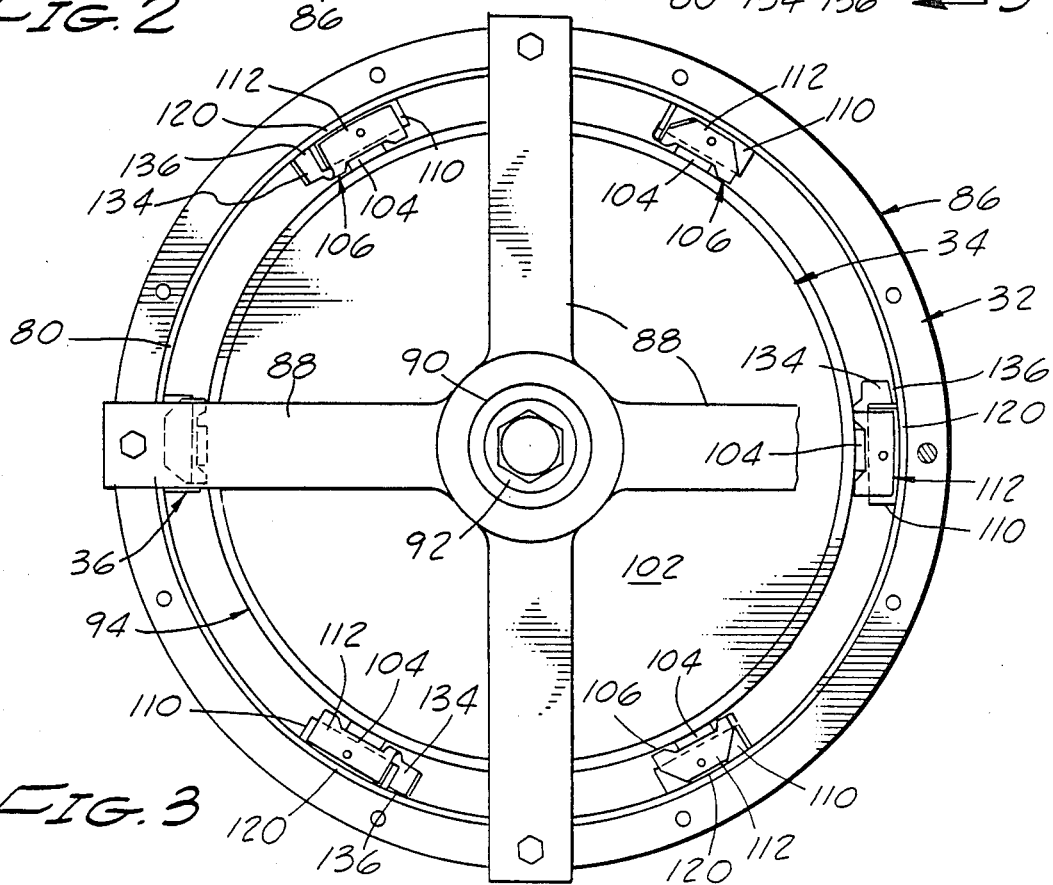
FIG. 3 is a view of FIG. 2.

Referring to FIGS. 2-4, the drum 94 is provided with a plurality of axially extending mounting bars 104 which are secured to the drum in circumferentially spaced relation. Referring also to FIGS. 5-8 and 12, the paddles 36 are secured to the mounting bars 104 by free-floating mounting means 106 in parallel relation to each other and in helical alignment relative to the axes of the screen and drum assemblies. The helical alignment for the paddles on the drum is best illustrated in FIG. 4.

Each of the paddles 36 includes a wiper blade 110 associated with a mounting plate 112 secured to the bars 104. A bolt 114 passes through aligned openings 116 in the bifurcated mounting plate 112 and an elongated slot 118 formed in the wiper blade 110. The wiper blades 110 are formed with an arcuately shaped outer edge 120 configured for mating alignment with the inner surface of the cylindrical screen 80.

Thus, the blades 110 are free to move radially relative to the drum 94 by virtue of the elongated slots 118. At the same time, the blades can also pivot to some extent about the axes of the bolts 114. Thus, as the cylindrical drum 94 is driven in rotation, generally with the cylindrical screen 80, the paddles 36 or blades 110 are urged radially outwardly by centrifugal force so that their outer surfaces or edges 120 enter into intimate or wiping contact with the inner surface of the cylindrical screen 80. However, the free-floating mounting of the blades 110 permits them to yield or move radially inwardly if necessary.

As the fluid or finished juice passes through the screen 80, it is collected in a pan assembly 122 formed by the lower portion of the housing 12 for passage into the juice outlet 22.

The relative rotational speeds of the screen assembly 32 and the drum assmbly 34 can be adjusted, for example, by varying the effective diameters of the pulleys. The relative rates of rotation for the screen assembly and drum assembly may be adjusted, for example, so that solids from the slurry approach the discharge end of the annular passage 96 for delivery to the solids outlet 24 at substantially the same time that all available fluid or juice has been extracted from the solids and passed through the screen 80.

The centrifugal finisher 10 is also adapted for development of a selected environment about the rotating screen assembly 32 as was also noted above. A fitting 124 provides access to the interior of the houisng 12 and can thus be used to produce a vacuum within the housing or to pressurize the housing with an inert gas, for example, nitrogen from a source (not shown) in order to enhance the quality of the fluid or finished juice obtained in the machine. In particular, where the machine is employed for the production of finished jucies, this feature of the invention is particularly contemplated for preventing oxidation which might otherwise have a deleterious effect on quality of the finished juice.

The construction features of the centrifugal finisher 10 of the present invention, as described above, generally correspond to features of the finishing machine disclosed in the above-noted patent. However, the improved centrifugal finisher and method of the present invention are dependent upon additional essential features which are described in detail below.

Referring particularly to FIGS. 2 and 4, the inlet axial end of the screen is generally indicated by an arrow 130 while the outlet axial end of the screen is generally indicated by an arrow 132.

Spreader means 134 are associated with a substantial portion of the wiper paddles 36 or blades 110 generally adjacent the outlet axial end of the screen. Accordingly, spreader means 134 are employed in association with substantially all of the wiper blades 110 toward the top of FIG. 4 corresponding with the outlet axial end represented by the arrow 132. Similarly, with the outlet axial end of the screen being toward the right end as viewed in FIG. 2, spreader means 134 are also shown in association with each of the wiper blades 110 adjacent that end of the screen. More particularly, the spreader means 134 are employed in combination with the wiper blades 110 over approximately three-quarters of the axial length of the screen as illustrated in FIGS. 2 and 4. The actual number of spreader means 134 and their association with selected wiper blades 110 is, of course, a matter of choice depending upon the particular application.

Continuing with combined reference to FIGS. 2-4, the spreader means 134 are formed as extensions from one of the bifurcated mounting plates 112 as may be best seen in FIG. 4. Referring particularly to FIG. 3, each of the spreader means or extensions 134 is formed with a spreader surface or edge 136 spaced slightly apart from the surface of the screen 80. The spreader edge 136 is accurately machined onto each of the spreader extensions 134 to provide a spacing of approximately 0.094 inch between the spreader edge 136 and the screen 80.

At the same time, referring particularly again to FIGS. 2 and 4, the spreader extension 134 is angled relative to the plate 112 and the wiper blade 110 in order to more effectively spread slurry solids into a thin layer over a substantial portion of the screen 80.

The spacing between the spreader edge 136 and the screen 80 is also a matter of design choice and the dimensions set forth about is only by way of illustration.

In any event, it can be seen that relative rotation between the screen assembly 32 and drum assembly 34 will cause the wiper blades 110 to be urged radially outwardly into wiping contact with the screen 80. With the spreader extensions 134 being integrally formed or affixed to the mounting plate 112, the free-floating mountings for the blades 110 also serve to assure proper fixed spacing between the screen and the spreader edges 136 of the spreader extensions 134.

Another embodiment of the invention is illustrated in FIG. 9 which provides a developed view similar to FIG. 4 as described above. The embodiment of FIG. 9 includes variations within the drum assembly indicated at 34' in FIG. 9. Except for the features described below with reference to FIGS. 9-11, other constructional features of the centrifugal finishing machine are in accordance with the preceding description.

In the embodiment of FIG. 9, the spreader means 134' are formed separtely from the wiper blades 110' and the free-floating mounting means 106'. In this embodiment, the spreader means 134' are formed as separate elements mounted on bars 104A which are similar to the bars 104' and corresponding bars 104 in FIG. 4. The bars 104A are arranged between the bars 104'. More particularly, each of the bars 104A is arranged closely adjacent a corresponding bar 104' so that the spreader elements 134' are in trailing and offset relation to the wiper blades 110' while being slightly spaced apart therefrom.

In the embodiment of FIG. 9, the spreader elements 134' are shown with approximately the same angular or helical alignment as the wiper blades 110'. However, it will be apparent that the angular relation between the wiper blades 110' and the spreader elements 134' could be varied, for example, to the angled relationship illustrated in FIG. 4.

Otherwise, referring also to FIGS. 10 and 11, the spreader elements 134' are illustrated as being mounted in fixed relation on the bars 104A. For example, in FIGS. 10 and 11, the spreader elements 134' are welded to the bars 104A as indicated by the fillets 138.

In any event, the spreader elements 134' are similarly formed to close tolerance, for example, by machining, so that their spreader edges 136' maintain the same spaced relation with respect to the screen 80' as described. Referring particularly to FIG. 10, the spreader edge 136' is also formed with an arcuate configuration for better mating with the configuration of the screen 80'.

The method of operation for the centrifugal finishing machine of the invention is believed apparent from the preceding description. However, the method of operation is briefly summarized below in order to ensure a complete understanding of the invention.

Initially, a slurry such as an initial or raw juice is pumped into the finisher 10 through the inlet 20 for passage through the inner shaft 38 and through the opening 76 for admission to the inlet end of the annular passage 96 as illustrated in FIG. 1. With the screen assembly 32 and drum assembly 34 being driven at carefully selected rates of rotation, preferably with the drum rotating at a slightly faster rate of speed, centrifugal force tends to urge the initial juice outwardly from the radial openings 76 toward the annular passage 96 and against the screen 80. The rotating conical wall 98 distributes the slurry more uniformly onto the screen 80. The effect of centrifugal force urges the fluid portion of the slurry through the screen 80 for passage toward the juice outlet 22.

The wiper paddles 36 or blades 110 and the spreader means 134 are rotating generally with the screen 80 while moving relative thereto because of the differential travel between the screen and drum as described above to perform a number of important and novel functions. Initially, the wiper blades 110 contact solids from the slurry and move them axially toward the outlet end of the screen. Particularly after the solids have travelled at least one-quarter of the distance along the screen, substantial fluid is lost through the screen so that the solids tend to be more compacted, thus tending to prevent movement of the fluid toward the screen. The spreader means 134 eliminate or minimize this effect by contacting and spreading the solids into a thin layer across a substantial portion of the screen in a manner which can be best seen with reference to FIGS. 4 and 9. By referring for example to FIG. 4, near the inlet axial end of the screen represented by the arrow 130, the high fluid content of the slurry solids allows then to be generally distributed or spread upon the screen by the wiper blades 110 alone. However, as a substantial portion of the fluid is lost from the slurry, the solids tend to be more compacted or bunched, thus interfering with further removal of fluid by centrifugal force as discussed above. At that point, for example, about one-fourth of the axial distance along the screen, the spreader means 134 provided an additional function of spreading the solids into a thin layer over a substantial portion of the screen as generally indicated at 140. The same effect is achieved in the embodiment of FIG. 9 as indicated at 140'.

Thus, the remaining slurry solids with some fluid content are spread into a thin layer upon the screen 80 to further facilitate removal of additional fluid or liquid by centrifugal force.

Thereafter, a subsequent wiper blade 110 again contacts the thinly spread solids and again bunches or compacts them, in the process turning them so that new surfaces of the slurry are exposed to the screen. Thereafter, subsequent spreader means again spread the solids upon the surface of the screen in the same manner described above so that substantially all of the fluid or liquid can be separated from the slurry very rapidly throgh the combined use of the wiper paddles 110 and spreader means 134 as described above.

Eventually, the wiper paddles shift the solids axially off of the outlet end of the screen. Thereafter, the solids are conducted to the discharge end of the passage 96 for transmission to the outlet 24. At the same time, all available fluid extracted from the slurry passes through the screen 80 under the influence of centrifugal force. The solids are then collected from the solids outlet 24 and the juice is collected from the outlet 22 in the manner described above.

As noted above, the relative rates of rotation for the screen assembly 32 and drum assembly 34 may be adjusted as necessary or desired. Similarly, a controlled environment can be developed within the housing through the fitting 124 as described above.

Accordingly, there has been disclosed a method and apparatus for extracting fluids or juices finished to a relatively high degree, from a slurry or initial juice including substantial solids. Numerous variations and modifications will be apparent from the preceding description. Accodingly, the invention is defined only by the following appended claims.

What is claimed is:

1. In a finishing machine for extracting finished juice from a slurry having substantial solids and including a housing, a cylindrical screen means mounted for rotation in the housing for retaining solid material from the slurry while allowing passage of slurry juice through the screen means, a slurry inlet in the housing for supplying slurry within one axial end of the cylindrical screen means, an outlet in the housing for receiving solids from the other axial end of the cylindrical screen means, a finished juice outlet arranged in the housing radially outwardly of the screen means, and drive means for rotating the screen means to exert centrifugal force on the slurry, the improvement comprising:
axially spaced apart sets of helically aligned wiper means arranged in rotationally wiping engagement with the cylindrical screen means and supported for movement relative to the screen means for successively moving solid material toward the outlet axial end of the screen means, and
spreader means arranged respectively in offset and trailing relation to at least a number of the wiper means and supported in slightly spaced apart relation from the screen means whereby the spreader means spread the solid material on the screen means before it is engaged and moved by the next set of wiper means in order to permit centrifugal force to more efficiently force juice from the slurry through the screen means.

2. The finishing machine of claim 1 further comprising support means for mounting the wiper means, the support means being adapted for rotation generally with said screen means.

3. The finishing machine of claim 2 further comprising differential means for adjusting the relative rates of rotation for the screen means and the support means to selectively regulate movement of the wiper means relative to the screen means.

4. The finishing machine of claim 3 wherein the wiper means comprises a plurality of free-floating wiper paddles each having a wiper edge for wiping contact with the surface of the screen means, the support means moutning the free-floating paddles in spaced apart relation to each other thereupon.

5. The finishing machine of claim 1 wherein the housing includes means for maintaining a controlled environment about the screen means.

6. The finishing machine of claim 5 wherein the means for maintaining a controlled environment about the screen means comprises means for introducing an inert gas into the housing and closed structure means for maintaining the inert gas as an atmosphere within the housing.

7. The finishing machine of claim 6 wherein an atmosphere of nitrogen is maintained within the housing.

8. The finishing machine of claim 2 wherein the support means comprises a cylindrical drum means forming an annular passage adjacent the screen means for receiving slurry from the slurry inlet, the wiper means comprising a plurality of paddles mounted in free-floating relation upon the drum means adjacent the cylindrical surface of the screen means.

9. The finishing machine of claim 1 further comprising a cylindrical drum means arranged within the cylindrical screen means to form an annular passage therebetween for receiving slurry from the slurry inlet, the wiper means comprising a plurality of paddles arranged in free-floating relation within the annular passage.

10. The finishing machine of claim 4 wherein the spreader means are formed as fixed extensions of the respective free-floating wiper paddles whereby the free-floating mountings of the wiper paddles on the support means serve both to maintain the wiper paddles in wiping contact with the screen means and to maintain the spreader means in spaced apart relation from the screen means.

11. The finishing machine of claim 10 wherein the fixed spreader extensions are angled relative to the respective wiper paddles for better distributing the solid material in a thin layer on the screen means.

12. The finishing machine of claim 11 wherein the spreader extensions are fixed to a substantial number of the wiper paddles adjcent the outlet axial end of the screen means.

13. The finishing machine of claim 4 wherein the spreader means are separately mounted on the support means from the wiper paddles.

14. The finishing machine of claim 1 wherein the spreader means are formed as fixed extensions of the respective wiper means.

15. The finishing machine of claim 14 wherein the spreader means are angled relative to the respective wiper means for better distributing the solid material in a thin layer on the screen means.

16. The finishing machine of claim 1 wherein the spreader means are separately and independently supported relative to the wiper means.

17. A finishing machine for removing solids from a slurry, comprising:
a housing,
a cylindrical screen means mounted for rotation in the housing,
inlet means for introducing the slurry into one axial end of the cylindrical screen means,
outlet means for receiving solids from the other axial end of the cylindrical screen means,
means for driving the cylindrical screen means at speeds adapted for centrifugally urging fluid components of the slurry through the screen means,
support means associated with the screen means for mounting a plurality of free-floating wiper means inside and generally adjacent the screen means, said support means adapting the wiper means for rotation generally with the screen means and for movement relative to the screen means and into wiping contact with the screen means for urging solids from the slurry toward the solids outlet, and
spreader means arranged respectively in offset and trailing relation to at least a number of the wiper means and supported in slightly spaced apart relation from the screen means whereby the spreader means spread the solid material on the screen means before it is engaged and moved by the next set of wiper means in order to permit centrifugal force to more efficiently force fluid from the slurry through the screen means.

18. The finishing machine of claim 17 further comprising differential means for adjusting the relative rates of rotation for the screen means and the support means to selectively regulate movement of the wiper means relative to the screen means.

19. The finishing machine of claim 17 wherein the spreader means are formed as fixed extensions of the repsective free-floating wiper means whereby the free-floating mounting of the wiper means on the support means serve both to maintain the wiper means in wiping contact with the screen means and to maintain the spreader means in spaced apart relation from the screen means.

20. The finishing machine of claim 19 wherein the fixed spreader extensions are angled relative to the respective wiper means for better distributing the solid material in a thin layer on the screen means.

21. The finishing machine of claim 20 wherein the spreader extensions are affixed to a substantial number of the wiper paddles adjacent the outlet axial end of the screen means.

22. The finishing machine of claim 17 wherein the spreader means are separately mounted on the support means from the wiper means.

23. A method for extracting finished juice from a slurry including substantial solids, comprising the steps of:
mounting a cylindrical screen means for rotation in a housing,
supplying slurry into one end of the cylindrical screen means,
rotating the screen means to exert centrifugal force on the slurry for urging the slurry juice to pass through the screen means,
arranging wiper means for rotation generally with the screen means and for movement relative to the screen means and into wiping contact with the screen means for moving the slurry solids axially along the cylindrical screen means,
arranging spreader means in respective offset and trailing relation to at least a number of the wiper means and supported in slightly spaced apart relation from the screen means whereby the spreader means spread the solid material on the screen means before it is engaged and moved by the next set of wiper means,
receiving the slurry solids at the other end of the cylindrical screen means, and
collecting finished juice after it passes through the screen means.

24. The method of claim 23 further comprising the step of adjusting the relative rate of rotation for the screen means relative to rotation of the wiper means and spreader means to selectively regulate movment of the wiper means and spreader means relative to the screen means.

25. The method of claim 24 wherein the spreader means are formed as fixed extensions of the respective free-floating wiper means whereby the free-floating mountings for the wiper means on the supprot means serve both to maintain the wiper means in wiping contact with the screen means and to maintain the spreader means in spaced apart relation from the screen means.

26. The method of claim 25 wherein the fixed spreader extensions are angled relative to the respective wiper means for better distributing the solids material in a thin layer on the screen means.

27. The method of claim 26 wherein the spreader extensions are affixed to a substantial number of the wiper means adjacent the outlet axial end of the screen means.

28. The method of claim 24 wherein the spreader means are separately mounted on the support means from the wiper means.

* * * * *